| United States Patent [19] | [11] Patent Number: 4,764,431 |
| Piacenti et al. | [45] Date of Patent: Aug. 16, 1988 |

[54] PROCESS FOR PROTECTING AND CONSOLIDATING STONE MATERIALS

[75] Inventors: Franco Piacenti, Florence; Adolfo Pasetti, Milan; Carlo Manganelli Del Fa, Castiglione Della Pescaia; Giovanni Moggi, Milan, all of Italy

[73] Assignee: Ausimont S.p.A., Milan, Italy

[21] Appl. No.: 831,588

[22] Filed: Feb. 21, 1986

[30] Foreign Application Priority Data

Feb. 22, 1985 [IT] Italy ............................. 19630 A/85

[51] Int. Cl.$^4$ .......................... B32B 27/00; B05D 3/02
[52] U.S. Cl. .................................. 428/421; 427/385.5; 427/393.6; 428/422; 428/540
[58] Field of Search ..................... 427/393.6; 428/421, 428/422, 540

[56] References Cited

U.S. PATENT DOCUMENTS

| 2,635,093 | 4/1953 | Miller et al. | 526/255 |
| 3,988,187 | 10/1976 | Witt et al. | 156/71 |
| 4,022,742 | 5/1977 | Yoshimura et al. | 427/314 |
| 4,347,268 | 8/1982 | Close | 427/385.5 |
| 4,495,248 | 1/1985 | Vasta | 428/422 |

*Primary Examiner*—Thurman K. Page
*Attorney, Agent, or Firm*—Stevens, Davis, Miller & Mosher

[57] ABSTRACT

The surface of stone materials, of tiles, of cement mixes and articles and structures manufactured therefrom are protected against atmospheric and polluting agents by superficially applying a protecting material consisting of a vinylidene fluoride polymer or copolymer comprising 55–100% by moles of vinylidene fluoride, 0–5% by moles of propene hexafluoride and 0–30% by moles of tetrafluoroethylene. Such polymers or copolymers are applied to the surface to be protected in the form of a solution in volatile solvents.

11 Claims, No Drawings

PROCESS FOR PROTECTING AND CONSOLIDATING STONE MATERIALS

This invention relates to a process for consolidating and protecting stone materials, tiles, cement mixes and articles and structures manufactured therefrom, which are externally exposed to the degradation caused by the atmospheric and polluting agents.

BACKGROUND OF THE INVENTION

As is known, the degradation of building materials, in particular marble, sandstones, tiles as well as decorative and artistic articles and structures manufactured from such materials is caused by two different kinds of phenomena: chemical phenomena and physical phenomena, both occurring in the presence of water.

A physical phenomenon affecting all the building materials is the one which is due to successive frosting and defrosting of the water absorbed by the pores of the material itself. Such phenomenon results in a variation of the specific volume and in tensions which are capable of causing fractures and/or decohesion (loss of cohesion) or in any case detachment from each other of the individual particles constituting the material.

Another physical phenomenon is the dissolution in water of the limestone contained in marbles as an essential component and in the stones as a binder, with consequent loss of cohesion of the granules.

Of the same importance for the degradation of the materials and manufactured articles and structures exposed to the atmosphere are an aggregation of ehcmical phenomena: these phenomena essentially involve the aggressive attack on the carbonate parts of the material or of the manufactured article or structure by the polluting agents present in the air (e.g., carbon dioxide, sulphur dioxide, nitrogen oxide). Such pollutants react with the material in the presence of water and their concentration is particularly high in the rain at the beginning of the precipitation.

It is known, too, that in order to overcome or at least to sensibly reduce the drawbacks described hereinabove it is necessary to remarkably reduce both the extent of penetration and the velocity of penetration of the water into the material to be protected.

To achieve this purpose, chemical compounds exerting both a water-repellent and a consolidating action are usually applied to the outer surface of the material to be protected.

In order to exert the desired protective action without simultaneously giving rise to accompanying degradtion phenomena or, in any case, undesirable secondary effects, the consolidating/protective agent must possess the following essential properties:

(1) capability of restoring the cohesion between the particles of the surface layer of the degraded material and the underlying integral part;
(2) to give a suitable mechanical resistance to the so-consolidated surface layer;
(3) capability of maintaining, in the consolidated surface layer, characteristics of elasticity in order to prevent
  —as conversely occurs with other products the
  —formation of a rigid surface layer with mechanical characteristics different from those of the substrate;
(4) chemical inertia towards the material to be protected/consolidated;
(5) low volatility;
(6) stability to the action of the atmospheric agents to light and to heat;
(7) causing no alterations to the chromaticity of the material; and
(8) capability of retaining in the long run its own solubility properties in order to insure the reversibility of the treatment.

As is known, film-forming substances such as glues, essiccative oils, resins and polymeric substances are often used to consolidate and protect stone materials. References to the use of such substances can be found in the book by Amoroso and Fassina "Stone Decay and Conservation", Elsewier Ed., Amsterdam, 1983.

Among such substances —not all being fully satisfactory for the abovesaid purposes —those most commonly used are: polyethyleneglycols and methylethers thereof, which exhibit, however, a high solubility in water, which limits the use of same to the protection of manufactured articles and structures not exposed to the external atmosphere; polyvinyl acetate and polyvinyl alcohol, which are affected by the drawback of being sensible to water, in which the former, furthermore, hydrolyzes and releases acetic acid; polymethylmethacrylate and acrylic resins in general, which, however, tend to yellowing over time and are not capable of securing a complete protection from $SO_2$ present in the atmosphere, while the thermosetting acrylic copolymers, endowed with better characteristics, have the drawback of being irreversible; silicone resins which, however, besides the possibility of releasing methanol, exhibit also the drawback of cross-linking, with consequent formation of a product no longer removable; epoxy resins, which tend to yellowing and, due to their structure of thermosetting resins, make it difficult or impossible to carry out reversible treatments; polyester resins, which suffer from the drawback of being sensitive to water (by the effect of which they tend to saponify), and also to cross-link, wherefore they lose the reversibility characteristic.

Such products, which are used in the conservation of stone and tile materials, besides not possessing generally, as illustrated hereinabove, characteristics of stability to chemical and physical aggressive agents, do also drastically reduce the permeability of the treated surface to the air and water vapor. Consequently, the articles and structures exposed to the ourdoors are affected by extremely strong alteration phenomena underneath the impermeable film, due to the action of condensated water inside the same materials.

The use of perfluor-polyethers for the abovesaid purposes, as is described in European patent No. 59,100, has solved the problem of the protection. However such compounds, owing to their being liquids, cannot exert any consolidating action.

THE PRESENT INVENTION

We have now found a method of consolidating and protecting stone materials, marble, sandstone, tiles, cement mixes and articles and structures manufactured from such materials, from the degradation caused by the action of polluting and atmospheric agents, which is free from the drawbacks deriving from the use of the materials mentioned above. Such method, which is the object of the present invention, consists in utilizing, as a protective material, a homo- or copolymer of vinylidene fluoride comprising, by moles, from 55 to 100% of vinylidene fluoride, from 0 to 30% of tetrafluoroethylene and from 0 to 45% of hexafluoropropene.

The homopolymers of vinylidene fluoride and the copolymers thereof, with the monomers mentioned above are well-known in the art for having been described, e.g., in British Pat. No. 888,765 and by Kirk Othmer in "Encyclopedia of Chemical Technology", Vol. 11, page 64, 1980.

Such homopolymers and copolymers can be utilized by applying a solution thereof to the surface of the material or the manufactured article or structure to be protected. The application can be by any of the conventional techniques, such as, e.g., by a brush, a compressed-air gun, by spraying or by immersion.

The fluoropolymer solution can be prepared in a suitable ketonic ester or ether solvent, which permits a suitable penetration of the fluid into the material as a function of the porosity of the material, and which has a sufficiently low boiling point as to quickly evapofate after the application, when a prompt removal of the solvent is desired or required. Particularly suitable for such purpose are esters such as methyl acetate or ethyl acetate, ketones such a methylethylketone, or ethers such as tetrahydrofuran or methylisobutylether.

Conversely, when a higher penetration of the solution along with a slower evaporation of the solvent are desired or required, it is possible to use solvents having a higher boiling. point, such as, for example, methylisobutylketone, butyl acetate or amyl acetate or other products having a similar structure.

By using suitable mixtures of solvents having a different volatility, the depth to which the solution penetrates the material to be protected and consolidated can be varied.

The concentrations of the fluoropolymer solutions to be employed in the practice of this invention preferably range from 1 to 20% by weight, the solvent being selected from those indicated hereinbefore or from among other solvents having volatilities of the same order of magnitude.

The amount of protective agent to be applied per surface unit of the material to be consolidated and protected depends on the physical characteristics of the surface, such as, for example, the porosity and disgregation state of the material, the higher the porosity and the disgregation state, the higher must be the amount of protective and consolidating solution to be employed.

The amount of protective agent is commonly comprised between 20 and 200 g per $m^2$ of surface to be treated.

The present invention is illustrated in the following examples which are given for merely illustrative and not limitative purpose.

EXAMPLE 1

Test pieces of $7 \times 7 \times 2$ cm were obtained from a sandstone block which had been exposed to the external atmosphere for many years and the most superficial part of which had undergone a rather high decohesion (loss of cohesion) accompanied by flaking off and sand-forming phenomena of the granules.

Selected were two test pieces (A1; A2), which exhibited reciprocally comparable water absorption values as a function of time.

One of the two test pieces (A1) was treated by immersion during 24 hours into a solution of a fluorinated copolymer ("Tecnoflon NML" produced by Montefluos) having the following molar composition: vinylidene fluoride (VDF)=79%, hexafluoropropene (HFP)=21%, and having a Mooney viscosity ML 1+4 (100° C.) of 65.

The other test piece (A2) was left as such as a check.

The solution of protective/consolidating agent was prepared by dissolving 10 g of the fluoropolymer in 100 ml of amyl acetate.

After evaporation of the solvent from test piece A1, check measurements were carried out on the test pieces. On their face, at intervals of 5 minutes, the amount of water absorbed in 30 minutes was measured and expressed in $cc/cm^2$ of contact surface.

Such measurement was carried out by applying to a face of the test piece an apparatus consisting of a glass cylinder filled with water and connected to a graduated micropipette which permitted measurement of the amount of water absorbed by the contact surface of the test piece. Such apparatus is described with further details in the document published by the Group Unesco —Rilem PEM with the number 78/182.

The relevant datea are indicated hereinbelow, expressed in $cm^3/cm^2$:

|    | 5'   | 10'  | 15'  | 20'  | 25'  | 30'  |
|----|------|------|------|------|------|------|
| A1 | 0.07 | 0.08 | 0.12 | 0.16 | 0.19 | 0.22 |
| A2 | 0.32 | 0.48 | 0.60 | 0.68 | 0.76 | 0.84 |

From a comparison between the data obtained from the two test pieces it is apparent that the consolidating/protective treatment drastically reduces the amount of water absorbed by the material.

EXAMPLE 2

On test piece A1, before the treatment of Example 1, the permeability to water vapor was determined as follows: the test piece was fixed, by means of a sealing agent, to a plexiglas container, into which 5 $cm^3$ of water had been previously introduced. The whole was weighed and then introduced into a calcium chloride drier.

At predetermined intervals of time, the test piece-container assembly was weighed. The tests were conducted at a constant temperature (20° C.).

The test was stopped after 168 hours. The same measurement was carried out on the same test piece after the treatment by immersion into the fluorinated copolymer.

The data obtained from the evaporation tests were the following:

| before the treatment | 2.2 g of evaporated water |
|---|---|
| after the treatment | 1.6 g of evaporated water. |

This example proves that the treatment according to this invention permitted a considerable migration of the water vapor.

EXAMPLE 3

This example proves the consolidation power of the protective material according to the present invention.

Out of 4 test pieces of altered "serena stone" measuring $5 \times 5 \times 1$ cm, two (A, B) were treated by immersion into a solution consisting of the fluoropolymer described in Example 1 at a concentration of 10% by weight in acetone, during 24 hours, while two test pieces (C, D) were left as such as a check.

After evaporation of the solvent (the amount of product absorbed by the material was 1% by weight), the test pieces so treated, i.e., A and B, were subjected to an abrasion resistance test, performed as follows: the test pieces were laid, on the side of one of the two faces of greater sizes, onto an abrasive paper strip (No. 80 produced by FLEXA); after having placed a weight of 2 kg on the test pieces, the test pieces were drawn on the abrasive paper over a distance of two meters at a constant speed of 1 m/minute.

The measurement is based on the weight loss due to abrasion of the test pieces treated and subjected to the test. Comparison is made of such loss with the one obtained with the non-treated test pieces.

The results are shown in the following table:

| Test Piece | Weight Before the Test | Weight After the Test | Weight Difference |
|---|---|---|---|
| A | 39.8971 g | 39.8330 g | 0.0641 g |
| B | 39.8530 g | 39.7968 g | 0.0562 g |
| C | 39.7254 g | 39.5654 g | 0.1600 g |
| D | 39.6354 g | 39.4890 g | 0.1564 g |

From the example it is apparent that the treated test pieces exhibited a higher resistance to abrasion as a consequence of the consolidation effect.

What is claimed is:

1. A process for protecting and consolidating stone materials, marble, sandstone, tiles, cement mixes and articles and structures manufactured therefrom from the degrading action exerted by atmospheric and/or polluting agents, characterized in that an uncured polymeric material consisting of a vinylidene fluoride homopolymer or copolymer is applied to the surface of such materials and manufactured articles and structures, said vinylidene fluoride homopolymer or copolymer containing from about 55 to about 100% by moles of vinylidene fluoride, from 0 to about 30% by moles of tetrafluoroethylene, and from 0 to about 45% by moles of hexafluoropropene.

2. The process according to claim 1, in which the homopolymer or copolymer is applied as a solution.

3. Articles and structures manufactured from stone materials, marble, sandstone, tiles, and cement mixes provided with a coat consisting of an uncured polymer or copolymer comprising from about 55 to about 100% by moles of vinylidene fluoride, from 0 to about 45% by moles of hexafluoropropene and from 0 to about 30% by moles of tetrafluoroethylene.

4. The process according to claim 2, in which the solvent for the homopolymer or copolymer is a ketone.

5. The process according to claim 4, in which the solvent is methylethylketone.

6. The process according to claim 2, in which the solvent is an ester.

7. The process according to claim 2, in which the ester is methyl acetate.

8. The process of claim 2 in which the solvent is an ether.

9. The process according to claim 2, in which the solvent is tetrahydrofuran.

10. The process of claim 2 in which the solvent for the homopolymer or copolymer has a boiling point not higher than 160° C.

11. The process of claim 2 in which the solvent for the homopolymer or copolymer has a boiling point not lower than 30° C.

* * * * *